Feb. 28, 1939. W. J. MORRILL ET AL 2,149,096
SWITCH
Filed May 25, 1937
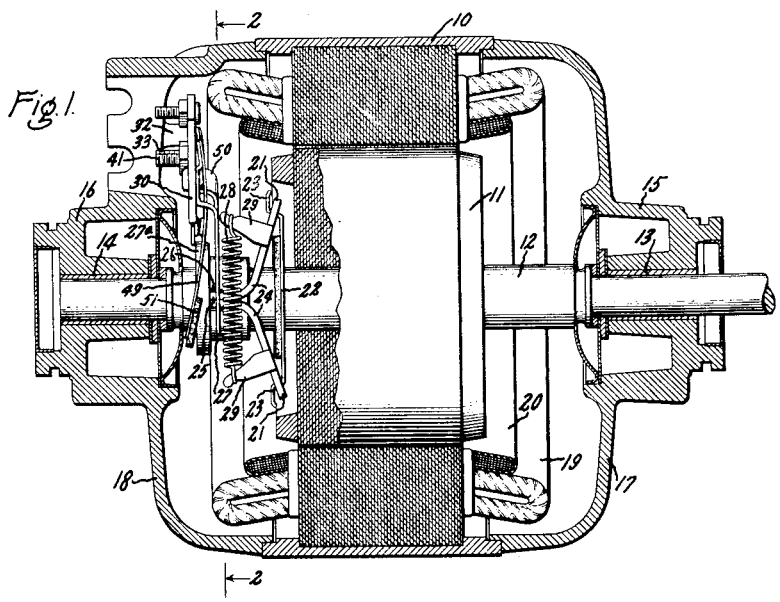
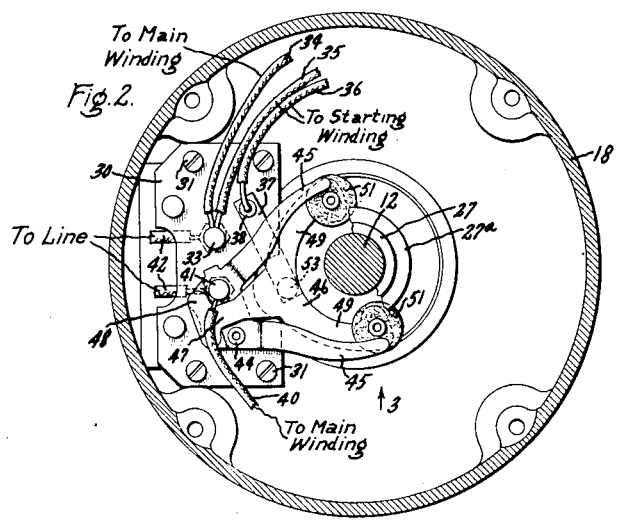
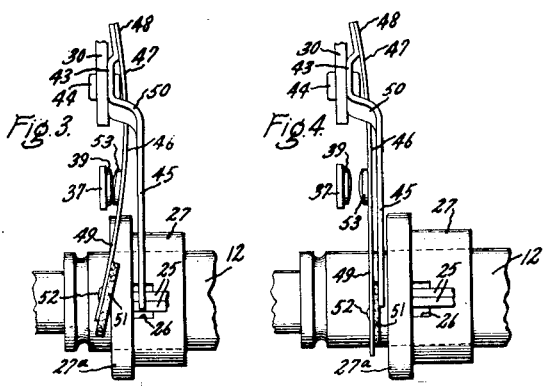
Inventors:
Wayne J. Morrill,
Carl P. Pepper,
by Harry E. Dunham
Their Attorney.

Patented Feb. 28, 1939

2,149,096

UNITED STATES PATENT OFFICE 2,149,096

SWITCH

Wayne J. Morrill and Carl P. Pepper, Fort Wayne, Ind., assignors to General Electric Company, a corporation of New York Application May 25, 1937, Serial No. 144,673

7 Claims. (Cl. 200—80)

Our invention relates to switches, such for example, as those used in dynamo-electric machines, and generally employed for controlling the circuits of starting windings in single phase induction motors, repulsion induction motors, or other electrical devices in which it is desired to control the circuits thereof, or other circuits in accordance with the speed of rotation of the switch.

An object of our invention is to provide an improved switch which is of simple construction, reliable in operation, and which can be readily manufactured.

Further objects and advantages of our invention will become apparent, and our invention will be better understood from the following description referring to the accompanying drawing, and the features of novelty which characterize our invention will be pointed out with particularity in the claims annexed to and forming a part of this specification.

For a better understanding of our invention, reference is made to the accompanying drawing, wherein Fig. 1 is a partial sectional side elevational view of a dynamo-electric machine embodying our invention; Fig. 2 is a sectional view taken along line 2—2 of Fig. 1 and turned through about 90°; Fig. 3 is an enlarged fragmentary view of the switch and associated parts as indicated by the arrow 3 in Fig. 2 with the electrical contacts of the switch in engaged position; and Fig. 4 is a fragmentary side elevation of the elements shown in Fig. 3 with the switch electrical contacts out of engagement.

Referring to the drawing, we have shown a dynamo-electric machine having a stationary member 10 and a rotatable member 11 mounted on a shaft 12, the ends of which are journaled in bearings 13 and 14, supported in hubs 15 and 16 formed on the ends shields 17 and 18, respectively, of the stationary member. In this instance the dynamo-electric machine is a single phase induction motor, and excitation is provided by a single phase main field exciting winding 19, and a starting field exciting winding 20, the rotatable member being provided with a cast squirrel-cage winding.

In this type of induction motor, it is desirable that the starting field exciting winding should be energized during the period when the motor starts to operate, or under such operating conditions that the speed of the motor is reduced beyond a predetermined value, and that it is deenergized when the speed of the motor exceeds a predetermined limit. In order to accomplish this, we provide a speed responsive mechanism which is arranged to operate the electrical contacts of a switch connected at the energizing circuit of the starting field exciting winding 20.

Any suitable speed responsive mechanism may be used to operate our improved switch, and in the embodiment of our invention illustrated in the drawing, a centrifugal mechanism is disclosed which is not our invention, but is the invention of Alfred F. Welch, and is described and claimed in his copending application, Serial No. 144,667, filed May 25, 1937, and assigned to the General Electric Company, assignee of this application. The centrifugal mechanism includes a pair of weights 21 secured to the rotor shaft by a resilient spring disk 22 pressed on the shaft 12 and provided with a pair of ears 23 slidably engaging slots formed in the weights 21. Each of the weights 21 is provided with a pair of arms 24 extending angularly therefrom, and provided with projections 25 at the ends thereof, which slidably and pivotally engage slots 26 formed in a collar 27 made of electrical insulating material, such as a phenolic condensation product with a suitable filler material. The centrifugal weights 21 are biased inwardly towards the shaft 12 by a pair of tension springs 28 arranged on opposite sides of the shaft 12. The opposite ends of each spring respectively engage notches formed in the ends of fingers 29, extending from adjacent sides of the two weights 21. These springs are arranged so that the position taken by the centrifugal mechanism when it is not rotating provides a greater leverage for the spring force acting upon the weights than the position of the centrifugal mechanism when it is rotating. This gives the device a snap action when the motor comes up to speed. As the weights 21 move outwardly, the spring leverage decreases, so that when a predetermined motor speed is reached, a further increase in speed is not necessary in order to produce a further outward movement of the centrifugal weights, as the effective force of the springs upon these weights tending to keep them in their inward position decreases due to the decreased leverage of the springs.

The collar 27 is provided with an annular flange 27a arranged to control the engagement and disengagement of a set of electrical contacts of a switch in the circuit of the starting winding 20. As shown in Fig. 2, this switch comprises a support 30 of insulating material secured to the stationary member 10 by screws 31 threaded into engagement with bosses 32 formed in the end shield 18. The support is provided with a terminal 33 arranged to be connected to an external source of electrical power supply, the terminal being connected by a conductor 34 to a terminal of the main field exciting winding 19, and being connected by a conductor 35 to a terminal of the starting field exciting winding 20. The other terminal of the starting field exciting winding is connected by a conductor 36 to a stationary electrically conductive element 37 secured in position on the support 30 by a hollow rivet 38 at one end of the conductive element 37. This element extends angularly from the support 30 toward the shaft 12, and an electrical contact 39 is rigidly secured to the free end thereof in any suitable manner, such as spot welding. The other terminal of the main field exciting winding is connected by a conductor 40 to a terminal 41 secured to the support 30, and to the external source of electrical power supply. The terminals 33 and 41 are connected to the source of supply by conductors 42. A substantially U-shaped mounting member has a base portion 43 secured to the support 30 by the terminal screw 41 and a hollow rivet 44, and is provided with a pair of arms 45 extending therefrom in equidistantly spaced relation on diametrically opposite sides of the shaft 12. A bifurcated flexible element 46 is secured to the base of the mounting member 43 through a resilient arm 47 in any suitable manner, as by spot welding, at 48. The bifurcated element is provided with two arcuate arms 49 extending therefrom in equidistantly spaced relation on opposite sides of the shaft 12. The base portion of the mounting member 43, to which the resilient arm 47 is secured, is offset from the portion which is riveted to the support 30, and the arms 45 are also offset at 50 in the same direction as the base portion of the mounting member 43. The arcuate arms 49 of the flexible element 46 extend in the same direction as the arms 45 of the mounting member, and cushioning pads 51 made of felt, or some similar material, are secured to the free ends of the arms 49 by hollow rivets 52. An electrical contact 53 is rigidly secured in any suitable manner, as by spot welding, to the element 46 midway between the arms 45, and is movably and resiliently secured thereby to the mounting member 43. This movable contact 53 is arranged in alignment and normally resiliently biased out of contact with the stationary electrical contact 39 by the arm 47 of the flexible element 46. The ends of the arms 45 engage the outer edge of the cushioning pads 51, forming stops which limit the normal biased out-of-contact position of the electrical contact 53, as shown in Figs. 2 and 4.

The position shown in Fig. 4 illustrates the relation of the contacts 39 and 53 when the dynamo-electric machine is operated at its normal speed, and with such an arrangement, the circuit of the starting winding 20 is broken by these contacts, and the excitation of the machine is supplied entirely by the main field exciting winding 19. When the dynamo-electric machine is at rest, the force of the springs 28 upon the weights 21 causes these weights to pivot about the inner corner of the projections 25 in the slots 26, and thus move the collar 27 axially along the shaft 12 away from the rotatable member 11. In this manner, the annular flange 27A of the collar 27 moves axially on the shaft 12 and engages the inner edge of the cushioning pads 51, thereby flexing the resilient element 46 and engaging the electrical contacts 38 and 53. This completes the electrical circuit between the terminal 33, the starting winding 20, the contacts 39 and 53, to the electrical terminal 41. In this manner, whenever the dynamo-electric machine is at rest, or operating below a predetermined speed, the circuit of the starting winding 20 is completed through the contacts 39 and 53, and whenever the machine attains a predetermined speed, these contacts are disengaged, and the circuit of the starting winding 20 is opened.

While we have illustrated and described a particular embodiment of our invention, modifications thereof will occur to those skilled in the art. We desire it to be understood, therefore, that our invention is not to be limited to the particular arrangement disclosed and we intend in the appended claims to cover all modifications which do not depart from the spirit and scope of our invention.

What we claim as new and desire to secure by Letters Patent of the United States, is:

1. A centrifugal switch including a support of electrical insulating material, a stationary electrical contact secured to said support, a substantially U-shaped mounting member having a base secured to said support and arms projecting therefrom, a flexible element of electrically conductive material secured to said mounting member adjacent the base thereof and having arms extending therefrom, a second electrical contact arranged in alignment with said stationary electrical contact and secured to said flexible element intermediate said arms, said arms of said U-shaped mounting member being arranged to form limit stops for the free ends of said arms of said flexible element, and speed responsive means arranged to control the flexing of said arms of said flexible element for controlling the engagement of said electrical contacts.

2. A centrifugal switch including a support of electrical insulating material, a stationary electrical contact secured to said support, a substantially U-shaped mounting member having a base secured to said support and arms extending therefrom, a flexible element of electrically conductive material secured to said mounting member adjacent the base thereof and having arms extending in an opposite direction therefrom, a second electrical contact arranged in alignment with said stationary electrical contact and secured to said flexible element, a cushioning pad secured to the free end of each of said arms of said flexible element, said arms of said mounting member being arranged to engage an edge of said cushioning pads to provide limit stops for said free ends of said arms of said flexible element, and speed responsive means arranged to engage said cushioning pads for controlling the engagement of said electrical contacts.

3. A centrifugal switch including a support of electrical insulating material, a stationary electrical contact secured to said support, a substantially U-shaped mounting member having a base secured to said support and arms extending therefrom, a flexible element of electrically conductive material secured to said mounting member adjacent the base thereof and having arms extending in opposite directions therefrom, a second electrical contact arranged in alignment with said stationary electrical contact and secured to said flexible element, said arms of said U-shaped member being arranged to form limit stops for the free ends of said arms of said flexible element, and means including an axially movable member operable to engage said free ends of said arms of said flexible element for controlling the engagement of said electrical contacts.

4. A switch for controlling a dynamo-electric machine or the like having a stationary electrical contact, a substantially U-shaped mounting member having a base and arms extending therefrom, a second electrical contact resiliently mounted on said mounting member in alignment and normally biased out of contact with said stationary electrical contact, said mounting member arms being arranged to provide a stop to limit the normal out-of-contact position of said second electrical contact, and means operable in response to the speed of the dynamo-electric machine for controlling the engagement of said electrical contacts.

5. A switch for a dynamo-electric machine or the like having a shaft, a stationary electrical contact, a substantially U-shaped mounting member having a base and arms extending therefrom, a flexible element secured to said mounting member adjacent the base thereof and having two arcuate arms extending on opposite sides of said shaft, a second electrical contact secured to said flexible element and held thereby in alignment and normally biased out of contact with said stationary electrical contact, a cushioning pad secured to each of said arcuate arms, said arms of said mounting member being arranged to engage said cushioning pads to provide stops to limit the normal out-of-contact position of said second electrical contact, and means operable in response to the speed of the dynamo-electric machine for controlling the engagement of said electrical contacts.

6. A switch for a dynamo-electric machine or the like having a rotatable shaft, a stationary electrical contact, a substantially U-shaped mounting member having a base and arms extending therefrom, each of said arms being arranged on opposite sides of said shaft, a flexible element of electrically conductive material secured to said mounting member adjacent the base thereof and having arms extending in opposite directions therefrom, each of said arms being arranged on opposite sides of said shaft, a second electrical contact secured to said flexible element and arranged in alignment and normally biased out of contact with said stationary electrical contact, said arms of said mounting member being arranged to provide stops to limit the normal out-of-contact position of said second electrical contact, and means including a member axially movable of said shaft operable in response to the speed of the dynamo-electric machine for controlling the engagement of said electrical contacts.

7. A switch including a support of electrical insulating material, a stationary electrical contact secured to said support, a substantially U-shaped mounting member having a base secured to said support and arms projecting therefrom, a flexible element of electrically conductive material secured to said mounting member adjacent the base thereof and having arms extending therefrom, and a second electrical contact arranged in alignment with said stationary electrical contact and secured to said flexible element intermediate said arms, said arms of said U-shaped mounting member being arranged to form limit stops for the free ends of said arms of said flexible element.

WAYNE J. MORRILL.
CARL P. PEPPER.